US007146126B2

(12) United States Patent
Yoshii et al.

(10) Patent No.: US 7,146,126 B2
(45) Date of Patent: Dec. 5, 2006

(54) FLEXIBLE AND DURABLE FIXING MEMBERS AND APPARATUS, AND IMAGE FORMING APPARATUS

(75) Inventors: Takayuki Yoshii, Yokohama (JP); Tsuneaki Kondoh, Ayase (JP); Kohji Kamiya, Yokohama (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 11/082,896

(22) Filed: Mar. 18, 2005

(65) Prior Publication Data

US 2005/0207806 A1 Sep. 22, 2005

(30) Foreign Application Priority Data

Mar. 19, 2004 (JP) ............................ 2004-080832
Jun. 30, 2004 (JP) ............................ 2004-194971

(51) Int. Cl.
*G03G 15/20* (2006.01)
*B32B 27/00* (2006.01)

(52) U.S. Cl. ..................... 399/329; 219/216; 399/330; 399/333; 428/319.3

(58) Field of Classification Search ................ 399/328, 399/330, 333, 320, 329; 428/335, 336, 421, 428/422, 319.3; 219/216
See application file for complete search history.

(56) References Cited

U.S. PATENT DOCUMENTS 4,829,931 A * 5/1989 Mogi .......................... 118/60
6,582,628 B1 * 6/2003 Kondo et al. ............... 252/511
6,861,124 B1 3/2005 Kamiya et al.
7,043,184 B1 * 5/2006 Kagawa et al. ............. 399/328
7,060,349 B1 * 6/2006 Tamemasa et al. ...... 428/319.1
2003/0235417 A1 12/2003 Aze et al.
2004/0069404 A1 4/2004 Kondoh
2004/0129062 A1 7/2004 Aze et al.
2004/0180167 A1 * 9/2004 Takayama et al. ....... 428/36.91
2004/0254300 A1 * 12/2004 Namimatsu et al. ........ 525/199
2005/0181150 A1 * 8/2005 Aono ...................... 428/32.34

FOREIGN PATENT DOCUMENTS

JP 10-142990 * 5/1998
JP 10-186923 7/1998
JP 2000-239596 * 9/2000
JP 2003-084598 3/2003
JP 2003-167462 6/2003
JP 2003-247927 9/2003
JP 2003-270967 9/2003
JP 2003-280434 10/2003
JP 2003-323066 11/2003
JP 2003-345162 12/2003
JP 2004-053842 2/2004
JP 2004-077886 3/2004
JP 2004-109930 4/2004
JP 2004-125942 4/2004
JP 2004-138956 5/2004
JP 2004-157529 6/2004
JP 2004-163715 6/2004
JP 2004-170758 6/2004
JP 2004-170859 6/2004
JP 2004-177780 6/2004

* cited by examiner

*Primary Examiner*—Hoan Tran
(74) *Attorney, Agent, or Firm*—Oblon, Spivak, McClelland, Maier & Neustadt, P.C.

(57) ABSTRACT

A fixing member includes a base member and an outermost layer located overlying the base member and having different fluororesins to fix a toner onto a sheet.

12 Claims, 6 Drawing Sheets

FIG. 6

TABLE 1

| | LARGE PARTICLE COMPONENT | | SMALL PARTICLE COMPONENT | |
|---|---|---|---|---|
| | MFR | PARTICLE DIAMETER | MFR | PARTICLE DIAMETER |
| EXAMPLE 1 | 2 | 10 | 7 | 0.1 |
| EXAMPLE 2 | 7 | 10 | 2 | 0.1 |
| COMPARATIVE EXAMPLE 1 | 2 | 10 | 2 | 0.1 |
| COMPARATIVE EXAMPLE 2 | 7 | 10 | 7 | 0.1 |

FIG. 7

TABLE 2

| | EXAMPLE 1 | EXAMPLE 2 | COMPARATIVE EXAMPLE 1 | COMPARATIVE EXAMPLE 2 |
|---|---|---|---|---|
| FLEXIBILITY | ○ | ○ | ○ | × |
| SURFACE SMOOTHNESS | ○ | △ | × | ○ |

FIG. 8

TABLE 3

| | LARGE PARTICLE COMPONENT | | | | SMALL PARTICLE COMPONENT | | | |
|---|---|---|---|---|---|---|---|---|
| | PFA | "O" VERSUS "C" RATIO IN MOLECULE CHAIN | MFR | AVERAGE DIAMETER μm | PFA | "O" VERSUS "C" RATIO IN MOLECULE CHAIN | MFR | AVERAGE DIAMETER μm |
| EXAMPLE 3 | A | 1 : 60 | 3 | 10 | B | 1 : 60 | 7 | 0.1 |
| EXAMPLE 4 | A | 1 : 60 | 3 | 10 | C | 1 : 60 | 14 | 0.1 |
| EXAMPLE 5 | B | 1 : 60 | 3 | 10 | A | 1 : 60 | 3 | 0.1 |
| EXAMPLE 6 | A | 1 : 60 | 3 | 10 | A | 1 : 60 | 3 | 0.1 |
| EXAMPLE 7 | B | 1 : 60 | 7 | 10 | B | 1 : 60 | 3 | 0.1 |
| COMPARATIVE EXAMPLE 3 | D | 1 : 150 | 3 | 10 | D | 1 : 150 | 3 | 0.1 |

PFA USED AS EXAMPLES & COMPARATIVE EXAMPLES ARE AS FOLLOWS :

A : 950 HP PLUS MANUFACTURED BY DU PONT-MITSUI FLUOROCHEMICALS CO, LTD.

B : 945 HP PLUS MANUFACTURED BY DU PONT-MITSUI FLUOROCHEMICALS CO, LTD.

C : 940 HP PLUS MANUFACTURED BY DU PONT-MITSUI FLUOROCHEMICALS CO, LTD.

D : 350-J MANUFACTURED BY DU PONT-MITSUI FLUOROCHEMICALS CO, LTD.

FIG. 9

TABLE 4

| | EXAMPLE 3 | EXAMPLE 4 | EXAMPLE 5 | EXAMPLE 6 | EXAMPLE 7 | COMPARATIVE EXAMPLE 3 |
|---|---|---|---|---|---|---|
| FLEXIBILITY | ○ | ○ | ○ | ○ | △ | △ |
| WEAR & ABRASION RESISTANCE | ○ | △ | ○ | ○ | △ | △ |
| SURFACE SMOOTHNESS | ○ | ○ | △ | △ | ○ | × |

FLEXIBLE AND DURABLE FIXING MEMBERS AND APPARATUS, AND IMAGE FORMING APPARATUS

CROSS REFERRENCE TO RELATED APPLICATION

This application claims priority under 35 USC §119 to Japanese Patent Application Nos. 2004-080832 filed on Mar. 19, 2004, and 2004-194971 filed on Jun. 30, 2004, entire contents of which are herein incorporating by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to a fixing member, a fixing apparatus, and an image forming apparatus having an outermost layer made of fluorine type resin on a fixing belt.

2. Discussion of the Background Art

A fixing apparatus is a well known device that pressure contacts a fixing member, such as a fixing belt, a fixing roller, etc., and fixes a toner image onto a transfer member. For example, a fixing apparatus discussed in Japanese Patent Application Laid Open No. 2002-268436 includes an endless fixing belt wound around a fixing roller having smaller belt curvature and a heat roller that applies heat and pressure contacts to heat and fix a toner image onto a transfer member. Such a fixing belt is generally formed from a base member made of heat resistant resin such as polyimide or metal, a heat resistant elastic layer such as rubber, elastomer, etc., and a releasing layer (i.e., an outermost layer) made of fluororesin. The releasing layer made of the fluororesin is formed by steps of producing a fluororesin tube by extrusion, wrapping the above-mentioned elastic layer with the fluororesin tube, and applying heat and melting (i.e., burning) the fluororesin. Otherwise, the releasing layer is formed by coating fluororesin particles with a spray to an elastic layer, and then burning the fluororesin. By forming the releasing layer with the fluororesin in such ways, a fixing belt having excellent releasing and heat resistant performances can be obtained. However, since the fluororesin lacks flexibility, crack appears on the releasing layer and belt flexibility becomes insufficient when it is wound around the fixing and heat rollers having small belt curvature for a long time. To resolve such a problem, various countermeasures have been attempted. For example, Japanese Patent Application Laid Open No. 2003-167462 discusses a fixing belt that employs a releasing layer made of fluororesin having a melt flow rate (MFR) of less than three to avoid crack even when the release layer is used for a long time.

However, since fluororesin of a low temperature melting type with a small MFR lacks fluidity when melting, the fluororesin melted during burning does not flow, and accordingly spoils smoothness of the fixing belt. As a result, unevenness occurs in brilliance on a fixed image on a transfer sheet when the fixing belt with poor smoothness fixes these images. Such problem is also found in a fixing roller.

SUMMARY

Accordingly, an object of the present invention is to address and resolve such and other problems and provide a new and novel fixing member. Such a new and novel fixing member includes a base member, and an outermost layer including two different fluororesins located overlying the base member to fix a toner image onto a sheet.

In another embodiment, a melt flow rate of one of the different fluororesins is equal to or greater than 7 (g/10 min), and that of the other is equal to or less than 3 (g/10 min) on condition that load is about 5 kgf weight and temperature is about 372 degree centigrade.

In yet another embodiment, the different fluororesins have particle diameters different from each other.

In yet another embodiment, the fluororesin having a greater melt flow rate has an average diameter smaller than the other having a smaller melt flow rate.

In yet another embodiment, the fluororesin having the greater melt flow rate is included in an amount of from about 35% to about 60% by weight based on the total weight of the outermost layer.

In yet another embodiment, the fluororesin includes a tetrafluoroethylene-perfluoroalkylvinylether copolymer resin.

In yet another embodiment, the tetrafluoroethylene-perfluoroalkylvinylether copolymer resin includes oxygen (o) and carbon (c) atoms by a ratio (o/c) equal to or greater than 1/60 in a molecule chain.

In yet another embodiment, the fluororesin includes a tetrafluoroethylene-perfluoroalkylvinylether copolymer resin having oxygen and carbon atoms by a ratio equal to or greater than 1/60 in a molecule chain.

In yet another embodiment, a thickness of the outermost layer is equal to or greater than 20 micrometer.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 6 illustrates various examples to be evaluated, each having a different combination of a melt flow rate and a particle diameter according to one embodiment of the present invention;

FIG. 7 illustrates evaluation results of flexibility and surface smoothness of the various examples of FIG. 6;

FIG. 8 illustrates various examples to be evaluated, each having a different combination of a melt flow rate, a particle diameter, and a ration of o/c atoms in a molecule chain according to one embodiment of the present invention; and FIG. 9 illustrates evaluation results of flexibility, wear resistance, and surface smoothness of the various examples of FIG. 8.

DESCRIPTION OF THE PREFERRED EMBODIMENTS

Figure 1:
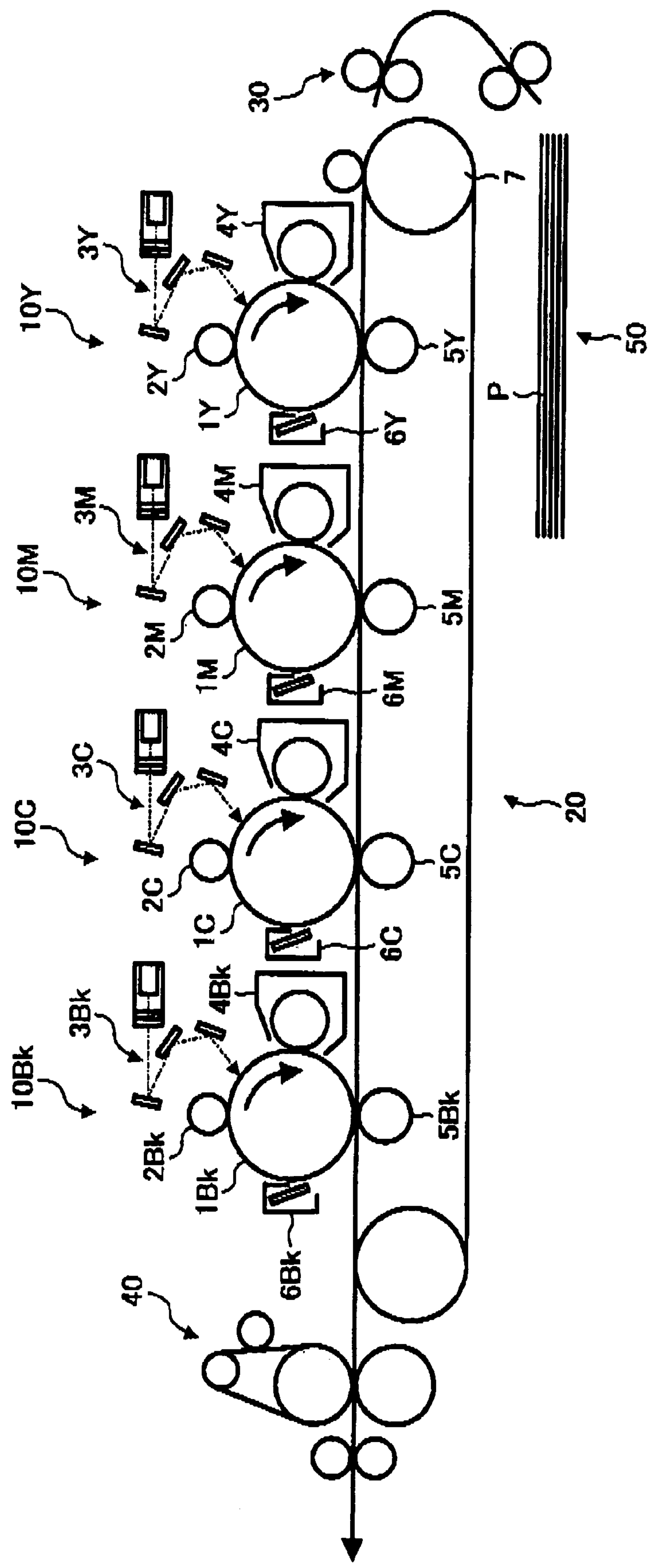
FIG. 1 illustrates an exemplary image forming apparatus that employs a fixing member such as a fixing belt according to one embodiment of the present invention.

Referring now to the drawing, wherein like reference numerals designate identical or corresponding parts throughout several views, in particular in FIG. 1, an exemplary image forming apparatus is described a plurality of image forming units 10Y, 10M, 10C, and 10Bk is arranged as a tandem type along a conveyance belt 20 that conveys a transfer sheet P serving as a printing medium from an upstream side. A moving member driving apparatus drives the conveyance belt 3 in the image forming apparatus.

Each of the image forming units 10Y to 10Bk in the image forming apparatus is designed such that the image forming units 10Y, 10M, 10C, and 10Bk form yellow, magenta, cyan, and black images in order using a known electro-photographic process. Each of the image forming units 10Y to 10Bk forms an image in a different color, but includes substantially the same interior configuration with the other. Then, each of parts of the image forming units 10Y, 10M, 10C, and 10Bk is distinguished by assigning letters Y, M, C, and Bk, to alphanumerical numbers of the parts as shown in FIG. 1. Hereinafter, a configuration of the image forming unit 10Y is typically described.

In FIG. 1, the conveyance belt 20 is formed from an endless belt, which is wound around a driving roller 7 and a driven roller 8 driven by the driving roller 7 to freely rotate in a direction shown by an arrow due to rotation of the driving roller 7. A sheet feeding tray 50 is arranged below the conveyance belt 20 to accommodate a transfer sheet stack. The uppermost sheet P on the sheet feeding tray 50 is launched and attracted to an outer surface of the conveyance belt 20 by electrostatic attraction when an image is formed. The sheet P on the outer surface of the conveyance belt 20 is first conveyed by the image formation unit 10Y.

The image formation unit 10Y at least includes a PC drum 1Y serving as a latent image carrier, and a charger 2Y, an exposure device 3Y, a developing device 4Y, and PC cleaner 6Y each arranged around the PC drum 1Y. The exposure device 3Y includes a laser scanner, and is enabled to reflect a laser light emitted from a laser light source with a polygon mirror, and output the laser light via an optical system employing a fθ lens, and a deflection mirror or the like. The peripheral surface of the PC drum 1Y is uniformly charged by the charger 2Y in darkness when an image is formed. Then, the peripheral surface of the PC drum 1Y with charge is exposed with a laser light of an image light corresponding to a yellow image. Such exposure causes a latent image on the peripheral surface of the PC drum 1Y corresponding to the yellow image. Yellow toner supplied by the developing device 4Y then visualizes the latent image. Accordingly, a yellow toner image is formed on the PC drum 1Y. The yellow toner image is then transferred onto a transfer sheet P at a transfer position, in which the transfer sheet P on the conveyance belt 20 contacts the PC drum 1Y, by the transfer device 5Y that is arranged being opposed to the PC drum 1Y via the conveyance belt 20. As a result, the yellow toner is formed on the transfer sheet P. Unnecessary toner remaining on the peripheral surface of the PC drum 1Y is removed by the PC cleaner 6Y for the PC drum 1Y to prepare the next image formation.

The transfer sheet P with the yellow toner image transferred from the image formation unit 1Y is conveyed to the image formation unit 10M by the conveyance belt 20. The image formation unit 10M forms a magenta image on the PC drum 1M using substantially the same process as the image formation unit 10Y. The magenta toner image is transferred to superimpose on the yellow toner image on the transfer sheet P by the transfer device 5M at the transfer position.

The transfer sheet P with transfer of yellow and magenta toner images is conveyed to the next image formation unit 10C by the conveyance belt 20. The image formation unit 10C forms a cyan toner image on the PC drum 1C using substantially the same process as the image formation units 10Y and 10M. The cyan toner image is transferred to superimpose on the yellow and magenta toner images on the transfer sheet P by the transfer device 5C at the transfer position.

The transfer sheet P with transfer of respective yellow, magenta, and cyan toner images is conveyed to the next image formation unit 10Bk by the conveyance belt 20. The image formation unit 10Bk forms a black toner image on the PC drum 1Bk using substantially the same process as the image formation units 10Y, 10M, and 10C. The black toner image is transferred to superimpose on the respective yellow, magenta, and cyan toner images on the transfer sheet P by the transfer device 5Bk at the transfer position.

Thus, a full color image is formed from respective toner images of yellow, magenta, cyan, and black toners on the transfer sheet P. The transfer sheet P with such a synthesized full-color image is separated from the conveyance belt 20 and is fixed by the fixing apparatus 40 after leaving the image formation unit 10Bk. The transfer sheet P is then ejected.

Figure 2:
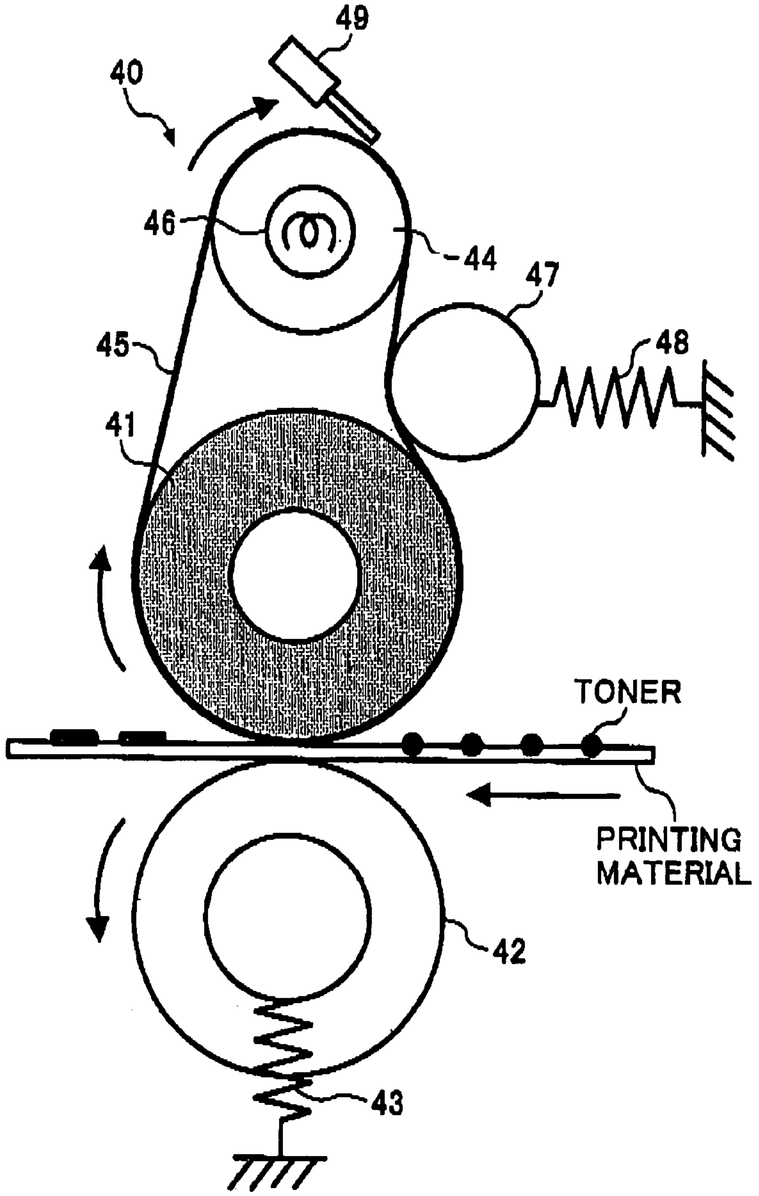
FIG. 2 illustrates an exemplary fixing apparatus that employs a fixing member such as a fixing belt according to another embodiment of the present invention.

With reference to FIG. 2, a belt type fixing apparatus 40 is now described. As shown, the fixing apparatus 40 includes a fixing belt 45 wound around a heat applying roller 44 and a fixing roller 41. The fixing roller 41 includes a metal core wrapped with a sponge rubber layer having heat resistance. The heat applying roller 44 includes a metal core again installing a heat applying member such as a halogen lamp 46 and thereby applies heat to the fixing belt 45 with its radiation heat from inside thereof. At a position opposing the heat applying roller 44, a thermistor 49 serving as a temperature sensor 49 is arranged to contact and detect a central portion of the fixing belt 45. Temperature of the heat applying roller 44 is adjusted at a prescribed level by controlling the halogen lamp 46 to light using a temperature control apparatus not shown. A pressure applying roller 42 is provided to contact the fixing roller 41 via the fixing belt 45. The pressure applying roller 42 pressure contacts the fixing roller 45 with a spring 43. The pressure applying roller 42 is rotated by a driving device not shown and drives the fixing roller 41. A tension roller 47 is arranged to contact the fixing belt 45 in the vicinity of a central portion thereof and upstream of a fixing nip. The tension roller 47 receives left ward pressure in the drawing from the spring 48. Thus, the fixing belt 45 is provided with some tension. Instead of the above, the driving device can be arranged to rotate the fixing roller 41 to drive the pressure applying roller 42. Further, the pressure applying roller 42 and fixing roller 41 can be meshed and rotated by the driving roller via gears.

In such a belt type fixing apparatus 40, a transfer sheet is passed between the fixing belt 45 heated by the heat applying roller 44 and the pressure applying roller 42, so that toner attracted to the transfer sheet P is soften by the heat of the fixing belt 45 and is fixed onto the transfer sheet when pressure is applied by the pressure applying roller 42.

Figure 3:
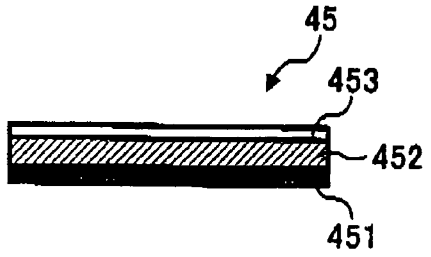
FIG. 3 illustrates an exemplary fixing member such as a fixing belt according to one embodiment of the present invention.

As shown in FIG. 3, the fixing belt 45 includes a cylindrical film base member 451 made of heat resistant resin, such as polyimide, etc., and an elastic layer 452 made of silicon rubber formed on an outer circumferential surface of the cylindrical film base 451 via primer. A release layer 453 made of fluororesin having a thickness equal to or greater than 20 micrometer is formed on the circumferential surface of the elastic layer 452 via primer. What ever material can be used as the base member 451 if it includes a heat resistant performance and mechanical intensity, such as heat resistant resin of polyimide, a metal of Ni or SUS, etc. What so ever elastic and heat resistant material can be used as the elastic layer 452 as far as it can uniformly apply heat and pressure to toner and a transfer sheet. Known fluororesin, such as PolyTetraFluoroEthylene (PTFE), tetrafluoroethelene-perfluoroalkylvinylether (PFA) copolymer, tetrafluoroethylene-hexaflluoropropyrene (FEP), etc., or their mixed material can be used as the release layer 453. Such release layer can be coated and burned on the elastic layer 452 via the primer.

Figure 4A:
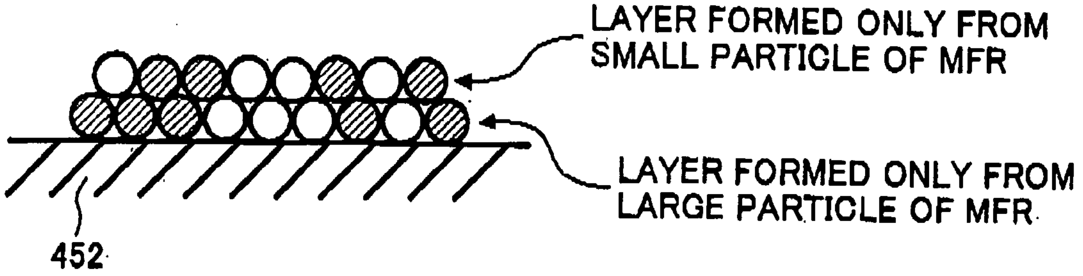
FIG. 4A illustrates exemplary fluororesin particles which adhere to an elastic layer when a release layer having a thickness of less than 20 micrometer is formed.
Figure 4B:
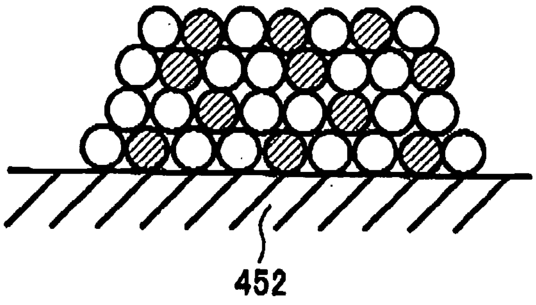
FIG. 4B illustrates exemplary fluororesin particles which adhere to an elastic layer when a release layer having a thickness equal to or greater than 20 micrometer is formed.

The fluororesin of the release layer includes plural types of fluororesins having different MFRs. Fluororesin having the large MFR is generally excellent in fluidity when being melted. Thus, fluororesin having the large MFR attracted to the elastic layer can uniformly form a coat on the surface of the fixing belt when being burned. As a result, the fixing belt can have a highly smoothed surface. However, such fluororesin lacks flexibility and tends to create crack during use due to suspension by the fixing roller 41 and the heat applying roller 44 as well as pressure applied by a tension roller 47. Fluororesin having small MFR is, on the other hand, excellent in the flexibility, and accordingly, hardly creates crack even used for a long time. However, since such fluororesin of a small MFR has poor fluidity when being melted, and does not flow during burning, fluororesin attracted to the elastic layer can't uniformly form a coat on the surface of the fixing belt. As a result, the fixing belt can have an uneven surface. However, the fluororesins having different type MFRs are used as a release layer as mentioned above, a fluororesin having large MFR makes the surface of the fixing belt smooth, while another fluororesin having small MFR improves the flexibility. Thus, the fixing belt can balance durability and flexibility. The fluororesin of the greater MFR is preferably included by about 35 to 60 weight %. A mixture ratio between fluororesins of large and small MFRs is preferably one vs. one. Thus, causing the ratio to be substantially the same, the fixing belt can balance durability and flexibility. Further, a thickness of the releasing layer is preferably equal to or greater than 20 micrometer. When the thickness is less than 20 micrometer, fluororesin particles having small and large MFRs are hardly dispersed in a layer of fluororesin particles coated and attracted to the elastic layer. Thus, as shown in FIG. 4A, a layer only formed from fluororesin particles of large MFR or that only formed from fluororesin particles of small MFR appear. A fixing belt formed by burning the fluororesin particles forming such a layer tends to lose flexibility and create crack at a layer formed only from a fluororesin of large MFR, and has protrusion and loses surface smoothness on a layer formed only from fluororesin of small MFR. However, by causing the thickness of the layer of the fluororesin particles coated and attracted to the elastic layer to be equal to or greater than 20 micrometer, the fluororesin particles having small and grate MFRs can be dispersed in the layer. Thus, the fixing belt can have excellent flexibility and surface smoothness.

When a release layer is to be formed by coating and burning fluororesin particles, two types of fluororesins obtained by mixing fluororesins of grate and small particles are preferably used. Since fluororesin particles having a small diameter have a poor cohesion performance, it can be uniformly dispersed into solvent such as water, etc. However, when a liquid having solvent and only fluororesin particles of a small diameter is coated to an elastic layer, crack tends to occur in a drying process wherein the solvent is removed after coating. On the other hand, since fluororesin particles of a large diameter have strong cohesion, crack hardly occurs in the drying process. However, since fluororesin particles having a large diameter can't be sufficiently dispersed into solvent such as water, etc, fluororesin particles do not uniformly stick to the elastic layer, resulting in a uneven coat, if liquid having solvent and only fluororesin particles of a large diameter is coated. However, by coating and burning the liquid obtained by mixing fluororesin particles of small and large diameter, fluororesin particles can be dispersed into the solvent and the uneven coat can be reduced or is sometimes omitted. Further, in the drying process after coating, crack can be suppressed by the fluororesin particles of the large diameter having high coherent, thereby, the release layer having an excellent durability can be obtained suppressing the crack.

Figure 5:
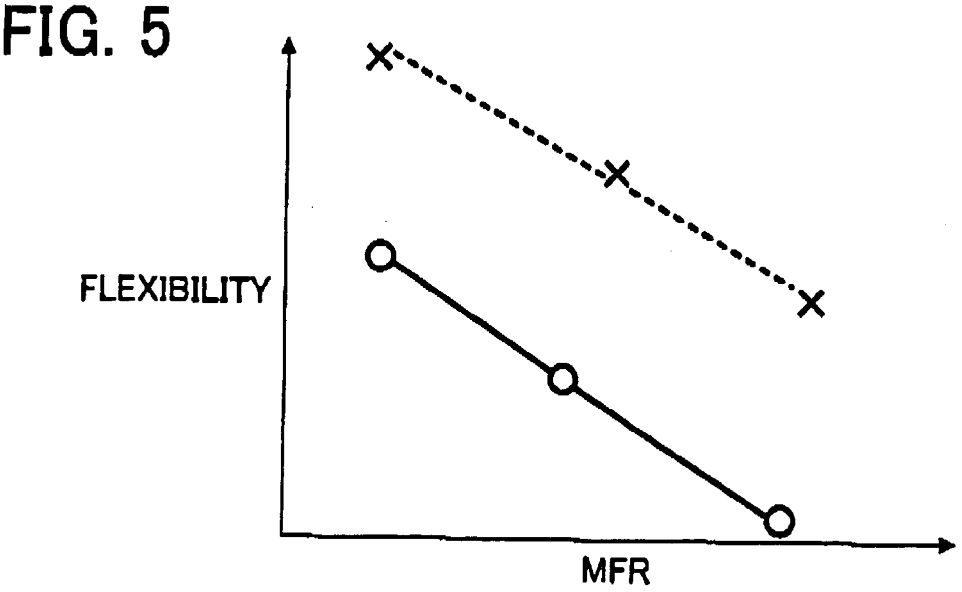
FIG. 5 illustrates exemplary flexibilities of PFAs having oxygen and carbon atoms in a molecule chain in a ratio equal to or greater than 1/60 or 1/100.

Further, by using PFA as a copolymer comprising tetrafluoroethylene and perfluoroalkylvinylether is used for the release layer 453, durable, nonadhesive, and abrasion resistant fixing belt can be obtained. Further, PFA having oxygen and carbon atoms in a molecule chain in a ratio of 1/60 is preferably used while increasing a value of the Perfluoroalkylvinylether. Now, flexibility is described with reference to FIG. 5, wherein a solid line represents PFA having oxygen and carbon atoms in a ratio equal to or greater than 1/60, while a doted line represents PFA having oxygen and carbon atoms in a ratio less than 1/100 in a molecule chain. As understood therefrom, flexibility of the former PFA is more improved than that of the latter PFA regardless of a MFR. That is, crystallization is suppressed and flexibility (i.e., bending life) is improved in the former PFA.

The above mentioned release layer is coated and burned on the elastic layer 452 via the primer. However, the present invention is not limited thereto. Specifically, the release layer can be obtained by first forming a tube made of fluororesin by extrusion, wrapping the elastic layer therewith via the primer, and burning those. However, in consideration of durability and flexibility of the fixing belt 45, thickness of the release layer is preferably equal to or greater than 20 micrometer. In such a situation, a method of coating and burning via primer is most preferable. The above-mentioned fixing belt 45 includes three layers of the film base member 451, the elastic layer 452, and the release layer 453. However, the fixing belt 45 can be two layers of the film base member 451 and the release layer 453.

Hereinafter, the present invention is described more in detail with reference to several embodiments. First, results of examining flexibility and surface smoothness of a fixing belt are described on conditions that MRF and a diameter of particles are differentiated. The MFR and the diameter of practical examples 1 and 2 and comparative examples 1 and 2 are summarized in a table 1, while evaluation results are illustrated in a table 2.

A fixing belt of the practical example 1 is produced as follows:

First, primer (e.g. DY 39-067 manufactured by Dow Corning Toray Silicon Co, Ltd.) is coated by 4 micrometer by a spray and is dried at room temperature on an outer circumference of a cylindrical endless film base member made of polyimide having thickness of 90 micrometer. Then, two liquids of two liquid addition type silicone rubber (e.g. DY 35-2083 manufactured by Dow Corning Toray Silicon Co, Ltd.) are mixed, and are then diluted with toluene. Such liquid is coated by 200 micrometer by a spray, and is hardened at 120 degree centigrade for ten minutes, and is secondarily hardened at 200 degree centigrade for 4 hours, thereby an elastic layer is formed. Then, primer (e.g. PR-990CL manufactured by Dupond-Mitsui Fluorochemical Co, Ltd.) is coated by a spray by 4 micrometer, and is then dried at 150 degree centigrade for 30 minutes. Then, dispersion obtained by mixing PFA (e.g. PFA-950HP. Plus manufactured by Dupond-Mitsui Fluorochemical Co, Ltd.) having a MFR (measurement standard: JIS K 7210) of 2 (g/10 min) on condition that load is 0.5 kgf weight and temperature is 372 degree centigrade, and an average particle diameter of 10 micrometer, with that (e.g. PFA-945HP Plus manufactured by Dupond-Mitsui Fluorochemical Co, Ltd.) having a MFR (measurement standard: JIS K 7210) of 7 (g/10 min) and an average particle diameter of 0.1 micrometer at the same rate is coated by a spray with 30 micrometer thickness. Then, the PFA particles are burned and melted at 340 degree centigrade for 30 minutes, so that a release layer is formed, thereby a fixing belt of the practical example 1 is obtained.

A fixing belt of a practical example 2 is produce as follows:

A release layer is formed on an elastic layer, which is similarly formed as in the practical example 1, using dispersion that is obtained by mixing PFA having a MFR (measurement standard: JIS K 7210) of 2 (g/10 min) on condition that load is 0.5 kgf weight and temperature is 372 degree centigrade and an average particle diameter of 0.1 micrometer, with that (e.g. PFA-945HP Plus manufactured by Dupond-Mitsui Fluorochemical Co, Ltd.) having a MFR (measurement standard: JIS K 7210) of 7 (g/10 min) on condition that load is 0.5 kgf weight and temperature is 372 degree centigrade and an average particle diameter of 10 micrometer at the same rate. A thickness of the release layer and the other conditions are similar to those in the practical example 1.

A fixing belt of a comparative example 1 is produce as follows:

A release layer is formed on an elastic layer, which is similarly formed as in the practical example 1, using dispersion that is obtained by mixing PFA (e.g. PFA-950HP Plus manufactured by Dupond-Mitsui Fluorochemical Co, Ltd.) having a MFR (measurement standard: JIS K 7210) of 2 (g/10 min) on condition that load is 0.5 kgf weight and temperature is 372 degree centigrade and an average particle diameter of 0.1 micrometer, with that (e.g. PFA-950HP Plus manufactured by Dupond-Mitsui Fluorochemical Co, Ltd.) having an average particle diameter of 10 micrometer at the same rate. A thickness of the release layer and the other conditions are similar to those in the practical example 1.

A fixing belt of a comparative example 2 is produce as follows:

First, a release layer is formed on an elastic layer, which is similarly formed as in the practical example 1, using dispersion that is obtained by mixing PFA (e.g. PFA-945HP Plus manufactured by Dupond-Mitsui Fluorochemical Co, Ltd.) having a MFR (measurement standard: JIS K 7210) of 7 (g/10 min) on condition that load is 0.5 kgf weight and temperature is 372 degree centigrade and an average particle diameter of 0.1 micrometer, with that (e.g. PFA-945HP Plus manufactured by Dupond-Mitsui Fluorochemical Co, Ltd.) having an average particle diameter of 10 micrometer at the same rate. A thickness of the release layer and the other conditions are similar to those in the practical example 1.

Flexibility is evaluated by installing fixing belts of practical examples 1 and 2 in the above-mentioned fixing apparatus 40, outputting three hundred thousand of sheets, and then visually checking crack on a release layer. When substantially no crack appears, a mark ○ is assigned. When slight crack not causing an abnormal image appears, a mark Δ is assigned. When crack causing an abnormal image appears, a mark X is assigned. Further, surface smoothness is evaluated by installing fixing belts of practical and comparative examples in the above-mentioned fixing apparatus 40, outputting images, and then visually checking unevenness of brilliance of the images. As shown in a table 2, when substantially no uneven brilliance appears, a mark ○ is assigned. When uneven brilliance slightly appears, a mark Δ is assigned. When uneven brilliance significantly appears, a mark X is assigned.

As understood from the tables 1 and 2, a fixing belt employing PFA of the comparative example having the small MFR, i.e., large molecule weight, is excellent in flexibility, but poor in surface smoothness. That is, PFA with a small MFR is poor in fluidity and does not flow when being burned and melted. Thus, it is supposed that the surface of the fixing belt of comparative example 1 includes unevenness and loses smoothness. In contrast, a fixing belt employing PFA with a great MFR, i.e., small molecule weight, is excellent in surface smoothness, because of its high fluidity, but is poor in flexibility in the comparative example 2. Fixing belts of practical examples 1 and 2 employ mixture of PFAs having smaller and greater MFRs. The PFA of the greater MFR flows during burning and improves surface smoothness of the fixing belt. The PFA of the small MFR improves flexibility of the fixing belt. Thus, these fixing belts of the practical examples 1 and 2 can be excellent in both flexibility and surface smoothness. The fixing belt of the practical example 1 is more improved in surface smoothness than that of the practical example 2. That is, the smaller diameter particles tend to create the surface smoothness when the PFA particles are melted. Thus, it is understood that the fixing belt with high surface smoothness can be obtained, because a particle diameter of PFA having high fluidity during burning (i.e., grate MFR) is minimized.

Hereinafter, results of examining flexibility, surface smoothness, and wear resistance of a fixing belt are described on conditions that a MRF, a diameter of a particle, a ratio of oxygen and carbon atoms in a molecule chain are differentiated. A MFR, a particle diameter, and a PFA in the practical examples 3 to 7 and the comparative example 3 are summarized on a table 3 while evaluation results are summarized on a table 4.

A fixing belt of a practical example 3 is produced as follows:

A release layer is formed on an elastic layer, which is similarly formed as in the practical example 1, using dispersion that is obtained by mixing PFA (e.g. PFA-945HP Plus manufactured by Dupond-Mitsui Fluorochemical Co, Ltd.) having a MFR (measurement standard: JIS K 7210) of 7 (g/10 min) on condition that load is 5 kgf weight and temperature is 372 degree centigrade, and an average particle diameter of 0.1 micrometer, oxygen and carbon atoms in a molecule chain in a ratio of 1/60, with that (e.g. PFA-950HP Plus manufactured by Dupond-Mitsui Fluorochemical Co, Ltd.) having a MFR (measurement standard: JIS K 7210) of 3 (g/10 min) on condition that load is 5 kgf weight and temperature 372 degree centigrade, an average particle diameter of 10 micrometer, and oxygen and carbon atoms in a molecule chain in a ratio of 1/60 at the same rate. A thickness of the release layer and the other conditions are similar to those in the practical example 1.

A fixing belt of a practical example 4 is produced as follows:

A release layer is formed on an elastic layer, which is similarly formed as in the practical example 1, using dispersion that is obtained by mixing PFA (e.g. PFA-940HP Plus manufactured by Dupond-Mitsui Fluorochemical Co, Ltd.) having a MFR (measurement standard: JIS K 7210) of 14 (g/10 min) on condition that load is 5 kgf weight and temperature is 372 degree centigrade, an average particle diameter of 0.1 micrometer, and oxygen and carbon atoms in a ratio of 1/60 in a molecule chain, with that (e.g. PFA-950HP Plus manufactured by Dupond-Mitsui Fluorochemical Co, Ltd.) having a MFR (measurement standard: JIS K 7210) of 3 (g/10 min) on condition that load is 5 kgf weight and temperature is 372 degree centigrade, and an average particle diameter of 10 micrometer, and oxygen and carbon atoms in a molecule chain in a ratio of 1/60 at the same rate. A thickness of the release layer and the other conditions are similar to those in the practical example 1.

A fixing belt of a practical example 5 is produced as follows:

A release layer is formed on an elastic layer, which is similarly formed as in the practical example 1, using dispersion that is obtained by mixing PFA (e.g. PFA-950HP Plus manufactured by Dupond-Mitsui Fluorochemical Co, Ltd.) having a MFR (measurement standard: JIS K 7210) of 3 (g/10 min) on condition that load is 5 kgf weight and temperature is 372 degree centigrade, an average particle diameter of 0.1 micrometer, and oxygen and carbon atoms in a molecule chain in a ratio of 1/60, with that (e.g. PFA-945HP Plus manufactured by Dupond-Mitsui Fluorochemical Co, Ltd.) having a MFR (measurement standard: JIS K 7210) of 3 (g/10 min) on condition that load is 5 kgf weight and temperature is 372 degree centigrade, an average particle diameter of 10 micrometer, and oxygen and carbon atoms in a molecule chain in a ratio of 1/60 at the same rate. A thickness of the release layer and the other conditions are similar to those in the practical example 1.

A fixing belt of a practical example 6 is produced as follows:

A release layer is formed on an elastic layer, which is similarly formed as in the practical example 1, using dispersion that is obtained by mixing PFA (e.g. PFA-950HP Plus manufactured by Dupond-Mitsui Fluorochemical Co, Ltd.) having a MFR (measurement standard: JIS K 7210) of 3 (g/10 min) on condition that load is 5 kgf and temperature is 372 degree centigrade, an average particle diameter of 0.1 micrometer, and oxygen and carbon atoms in a molecule chain in a ratio of 1/60, with that (e.g. PFA-950HP Plus manufactured by Dupond-Mitsui Fluorochemical Co, Ltd.) having a MFR (measurement standard: JIS K 7210) of 3 (g/10 min) on condition that load is 5 kgf weight and temperature is 372 degree centigrade, an average particle diameter of 10 micrometer, and oxygen and carbon atoms in a molecule chain in a ratio of 1/60 at the same rate. A thickness of the release layer and the other conditions are similar to those in the practical example 1.

A fixing belt of a practical example 7 is produced as follows:

A release layer is formed on an elastic layer, which is similarly formed as in the practical example 1, using dispersion that is obtained by mixing PFA (e.g. PFA-945HP Plus manufactured by Dupond-Mitsui Fluorochemical Co, Ltd.) having a MFR (measurement standard: JIS K 7210) of 3 (g/10 min) on condition that load is 5 kgf and temperature is 372 degree centigrade and an average particle diameter of 0.1 micrometer with a ratio of 1/60 between oxygen and carbon atoms in a molecule chain, with that (e.g. PFA-945HP Plus manufactured by Dupond-Mitsui Fluorochemical Co, Ltd.) having a MFR (measurement standard: JIS K 7210) of 7 (g/10 min) on condition that load is 5 kgf weight and temperature is 372 degree centigrade, an average particle diameter of 10 micrometer, and oxygen and carbon atoms in a molecule chain in a ratio of 1/60 at the same rate. A thickness of the release layer and the other conditions are similar to those in the practical example 1.

A fixing belt of a comparative example 3 is obtained as follows:

A release layer is formed on an elastic layer, which is similarly formed as in the practical example 1, using dispersion that is obtained by mixing PFA (e.g. PFA-350-J manufactured by Dupond-Mitsui Fluorochemical Co, Ltd.) having a MFR (measurement standard: JIS K 7210) of 3 (g/10 min) on condition that load is 5 kgf weight and temperature is 372 degree centigrade, an average particle diameter of 0.1 micrometer, and oxygen and carbon atoms in a molecule chain in a ratio of 1/50, with that (e.g. PFA-350-J manufactured by Dupond-Mitsui Fluorochemical Co, Ltd.) having a MFR (measurement standard: JIS K 7210) of 3 (g/10 min) on condition that load is 5 kgf weight and temperature is 372 degree centigrade, an average particle diameter of 10 micrometer, and oxygen and carbon atoms in a molecule chain in a ratio of 1/150 at the same rate. A thickness of the release layer and the other conditions are similar to those in the practical example 1.

Flexibility and surface smoothness are evaluated on substantial the same manner as in the practical examples 1 and 2, and the comparative examples 1 and 2. Wear resistance is evaluated by installing fixing belts of practical examples 3 to 7 and comparative example 3 in the above-mentioned fixing apparatus 40, outputting three hundred thousand of sheets, and then visually checking a portion of an image that a Thermistor™ contacts. These results are shown in table 4.

As understood from the tables 3 and 4, a fixing belt can have excellent flexibility, wear resistance, and surface smoothness in the practical examples 3 to 5 in comparison with that in the comparative example 3. That is because, PFA having oxygen and carbon atoms in a molecule chain in a ratio of 1/60, specifically, PFA having Perfluoroalkylvinylether at a high copolymer ratio is utilized, and accordingly crystallization is suppressed in the PFA. In particular, when comparing with fixing belt of the comparative example 3 with the practical examples 5 and 6, it is understood that the latter two fixing belts are excellent in surface smoothness. As mentioned above, PFA having the small MFR is poor in fluidity, and hardly creates surface smoothness. The comparative example 3 represents that because PFA having oxygen and carbon atoms in a molecule chain in a ratio of 1/150, specifically, PFA having Perfluoroalkylvinylether in a low copolymer ratio is utilized, crystallization is progressed and becomes large. It is further supposed that such large crystal size PFA further deteriorates the surface smoothness. In contrast, it is found in the practical examples 5 and 6 that uneven brilliance only slightly occurs when PFA having a small MFR is utilized, because PFA having oxygen and carbon atoms in a molecule chain in a ratio of 1/60 is included. This is further because, crystallization is suppressed in such PFA different from when PFA having oxygen and carbon atoms in a molecule chain in a ratio of 1/150 is utilized. Accordingly, it is supposed that influence of a crystal size of PFA is suppressed to be small in the practical examples 5 and 6, and as a result, surface smoothness remains within a permissive range.

Numerous additional modifications and variations of the present invention are possible in light of the above teachings. It is therefore to be understood that within the scope of the appended claims, the present invention may be practiced otherwise that as specifically described herein.

What is claimed is:

1. A fixing member configured to fix a toner image onto a sheet, said fixing member comprising:

a base member; and an outermost layer located overlying the base member and comprising at least two fluororesins of the same kind but having different melt flow rates.

2. The fixing member according to claim 1, wherein a melt flow rate of one of said at least two fluororesins is equal to or equal to or greater than 7 (g/10 min), and that of the other fluororesin of said at least two fluororesins is equal to or less than 3 (g/10 min) on condition that a load is about 5 kgf weight and a temperature is about 372 degree centigrade.

3. The fixing member according to claim 1, wherein said at least two fluororesins have particle diameters different from each other.

4. The fixing member according to claim 3, wherein one of said at least two fluoresins has a greater melt flow rate and has an average diameter smaller than the other of said at least two fluororesins.

5. The fixing member according to claim 1, wherein one of said at least two fluoresins has a greater melt flow rate;

wherein said fluororesin having the greater melt flow rate is included in an amount of from about 35% to about 60% by weight based on the total weight of the outermost layer.

6. The fixing member according to claim 1, wherein said fluororesin comprises a tetrafluoroethylene-perfluoroalkylvinylether copolymer resin.

7. The fixing member according to claim 6, wherein said tetrafluoroethylene-perfluoroalkylvinylether copolymer resin comprises oxygen (o) and carbon(c) atoms by a ratio (o/c) equal to or equal to or greater than 1/60 in a molecule chain.

8. The fixing member according to claim 1, wherein a thickness of said outermost layer is equal to or greater than 20 micrometer.

9. A fixing apparatus, comprising:

a fixing device configured to rotate: and a heat source configured to heat the fixing device;

wherein said fixing device pressure contacts, heats, and fixes the toner image onto the sheet, and wherein said fixing device employs the fixing member as claimed in claim 1.

10. An image forming apparatus, comprising:

an image bearer;

a toner image forming device configured to form a toner image on the image bearer;

a transfer device configured to transfer the toner image on the image bearer to a sheet; and a fixing system configured to fix the toner image onto the sheet; wherein said fixing system employs the fixing device as claimed in claim 9.

11. The fixing member according to claim 1, wherein said fluororesin of the same kind is a tetrafluoroethylene-perfluoroalkylvinylether copolymer resin.

12. A fixing member, comprising:

a base member; and an outermost layer located overlying the base member and comprising at least two different fluororesins;

wherein said fluororesin includes a tetrafluoroethylene-perfluoroalkylvinylether copolymer resin having oxygen and carbon atoms by a ratio equal to or greater than 1/60 in a molecule chain.

* * * * *